June 17, 1952     W. B. CRAWFORD     2,600,974
HANGER FITTING
Filed June 23, 1949
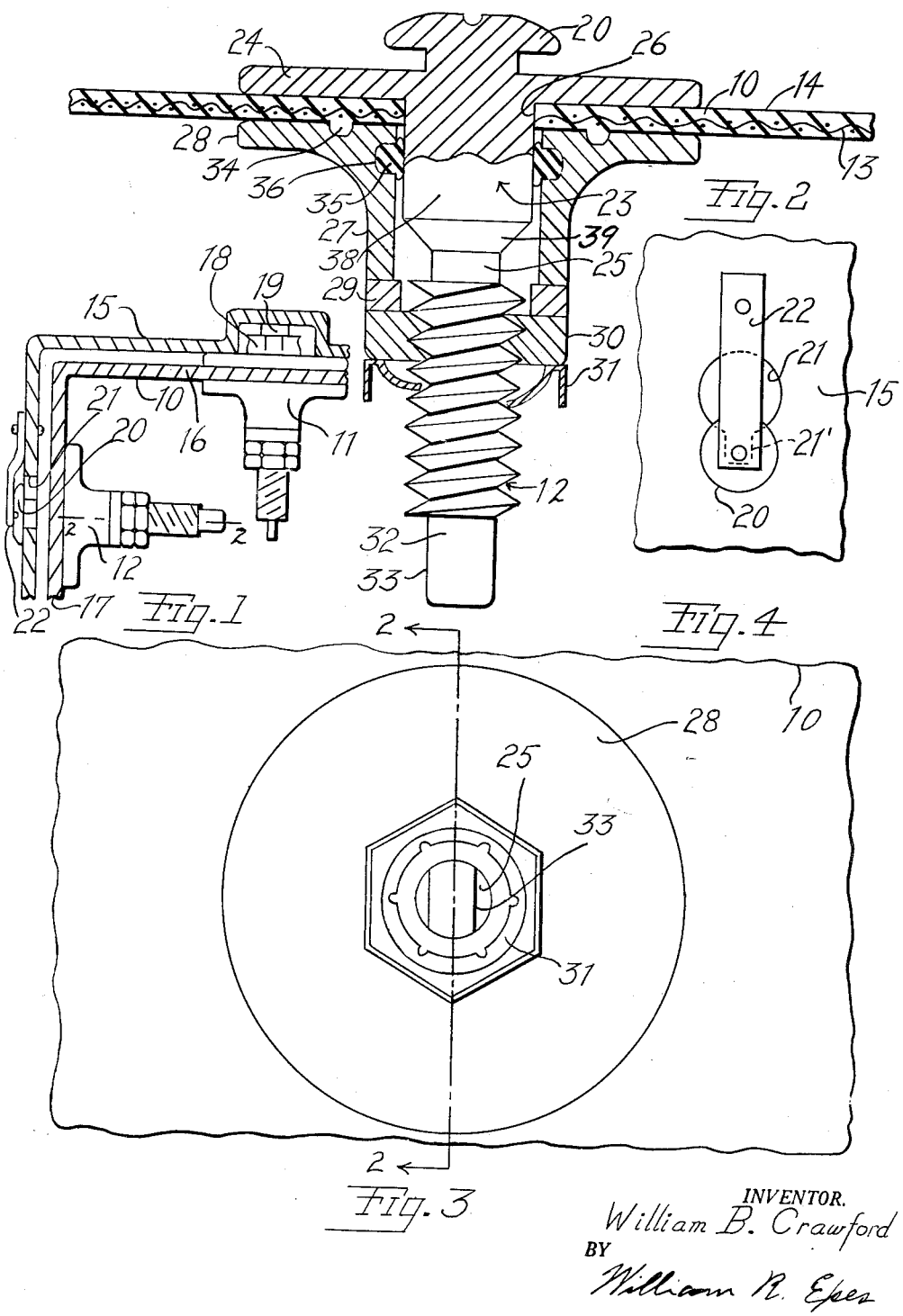
INVENTOR.
William B. Crawford
BY
William R. Epes Patented June 17, 1952

2,600,974

UNITED STATES PATENT OFFICE 2,600,974

HANGER FITTING

William B. Crawford, South Bend, Ind., assignor to United States Rubber Company, New York, N. Y., a corporation of New Jersey Application June 23, 1949, Serial No. 100,917

4 Claims. (Cl. 150—0.5)

This invention relates to an improved detachable hanger fitting for liquid containers having flexible walls. The invention relates more particularly to a detachable fitting which is adapted to be attached to and detached from the container walls, and which is also adapted to be operated from the inside of the tank for the purpose of securing the fitting to a supporting structure.

The hanger fitting embodying this invention is useful in connection with aircraft fuel cells for securing its flexible walls of fabric and rubber to the rigid supporting structure of the aircraft to prevent the cell from moving in respect to the supporting structure and breaking or damaging its outlet and inlet connections. The requirements of the fitting are that it may be operated by a workman from the inside of the fuel cell for the purpose of attaching the fitting to the supporting structure on the outside of the cell.

Under these requirements, it is essential that the fitting be provided with a hand grip at one end on the inside of the cell and an attaching head at the other end which extends through the wall of the cell. The opening in the fuel cell wall through which the fitting passes must be securely sealed to prevent leakage of the fuel, and the union between the fitting and the wall of the cells must be sufficiently strong to resist the movement of the cell in respect to the supporting structure at the place of attachment of the fitting.

Heretofore, such requirements have been complied with by constructing the fitting from a metal stud, which was provided with an attaching head adapted to be secured to the supporting structure on the outside of the fuel cell. The stem of the stud projected through the wall of the fuel cell to the inside thereof and was covered with a casing of oil resistant synthetic rubber, which was molded around and vulcanized to the stud. The casing over the stem of the stud acted as a hand grip to operate the attaching head of the fitting. The casing of rubber was provided with a flange which sealed the opening through which the stem of the stud extended. The seal was formed by adhesively uniting the flange to the wall of the cell after the molding and vulcanizing operation.

Prior fittings as described above have some disadvantages. They must be prepared in a mold under heat and pressure to integrally bond the rubber flange and casing to the metal stud. This molding operation is expensive and there are some rejects due to poor bonding of the rubber to the metal stud. Furthermore, considerable care is required to adhere the molded fitting flange securely to the cell wall so that the liquid contents of the cell will not escape through the opening in wall provided for the fitting. If for some reason the fitting becomes damaged so that it will no longer serve to hold the flexible cell to the supporting housing, it is difficult to replace it with a new fitting, because the flange of the fitting is so firmly bonded to the container wall that it must be torn or cut out.

The object of the present invention is to obviate these disadvantages by providing a fitting made entirely from a rigid material, such as metal, thus eliminating all need for a molded synthetic rubber flange, and the bonding difficulties attendant to the molding operation. A further object is to provide a fitting which may be simply and easily installed or removed from the cell with common tools operated from the inside of the cell. Another object is an improved fitting construction which permits no escape of liquid through the opening in the cell wall.

These and other objects will be more clearly understood by referring to the following description and the accompanying drawings in which:

Fig. 1 is a cross-sectional view of a portion of a flexible fuel cell installed in a supporting housing illustrating the function of the hanger fittings embodying this invention;

Fig. 2 is an enlarged partial cross-sectional view through a typical hanger fitting and the wall of the cell in which it is installed, and taken on line 2—2 of Figs. 1 and 3;

Fig. 3 is a top plan view of the fitting shown in Fig. 2; and

Fig. 4 is an outside face view of a supporting plate, showing the typical hanger connected thereto.

Fig. 1 shows a fuel cell or container 10 provided with fittings 11 and 12 embodying this invention. As shown in Fig. 2, the wall of the container is made from fabric 13 coated with plastic material 14 such as synthetic rubber which is resistant to the contents of the container. For instance, for gasoline containers a butadiene-acrylonitrile copolymer rubber or a polychloroprene rubber is suitable. The container 10 is completely supported by a rigid structure or housing 15 which is usually a part of the vehicle in which the container is located. In an airplane, such housing forms part of the wings or fuselage, and is made from aluminum. Fittings 11 serve to hold the top wall 16 of the container 10 to the top of the housing 15, and the slightly different fitting 12 holds up the side walls 17 of the flexible container.

The fittings 11 and 12 differ from each other only in the construction of their attaching heads which are adapted to engage and be secured to the complementary fixed members on the housing 15. The fittings 11 have attaching heads 18 in the form of female snap buttons, which are adapted to engage a complementary male member 19 anchored to the housing 15. This type of snap fastener is well known and is commonly used on briefcases and galoshes, and other types of articles where it is required to detachably secure one member to another.

The fitting 12 has an attaching head 20 made in the form of a button which slips into a mating keyhole slot 21 in the supporting housing 15 on the outside of the container 10. A spring clip 22 engages the head of the button 20 to prevent it from being disengaged from the narrow end 21' of the slot 21.

The important characteristics of the invention are clearly illustrated in Fig. 2 in respect to the fitting 12, and since the characteristics of the fittings 11 are the same as those of the fittings 12, excepting for the attaching head, which is well known, only the details of the fittings 12 will be described and shown. The fitting 12 is made entirely of any suitable rigid material, preferably aluminum, and it comprises a stud 23 having a flange 24 and the attaching head 20 formed integrally with a stem 25 which projects through an opening 26 in the container wall 10. A rigid sleeve 27 fits over the stem 25, and it is provided with a flange 28, which abuts against the container wall 10. A washer 29 fits over the stem 25, which is threaded to receive a nut 30 adapted to be turned down on the threads to clamp the container wall 10 between the flanges 24 and 28 of the stud stem 25 and sleeve 27, respectively. A locking nut 31 is threaded down on the stem to retain the nut 30 in place. The extreme end 32 is provided with a flat portion 33 beyond the threads to receive a wrench for holding the stem 25 of the stud from rotating during the tightening of the nuts 30 and 31. Instead of using a separate lock nut 31, a combination lock and clamping nut may be used, such as the commonly known elastic stop nut having a threaded metal bore and an unthreaded fiber bore, in which the threads are cut by the bolt.

The sleeve flange 28 is provided with a circular groove 34 for the purpose of receiving the rubber 14 on the fabric and preventing it from flowing outwardly around the edges of the flanges 24 and 28 under the pressure of the nut 30. Sufficient pressure is imposed between the flanges 24 and 28 to form a leak-proof joint between the contacting surfaces of the container wall and the flange 28 of the sleeve. The imposed pressure between the flanges also forms a secondary seal between the flange 24 and the wall 10 of the container.

Leakage of the liquid from the container 10 along the stem 25 of the stud is prevented by a packing ring 35 positioned in an annular groove 36 of the sleeve 27. The packing 35 is compressed between the groove and a cylindrical portion 38 on the stem 25 with sufficient pressure to form a seal between such members. The diameter of the threaded portion of the stem 25 is smaller than the diameter of the cylindrical portion 38. The original diameter of the packing is smaller than the diameter of the cylindrical portion 38, but is adapted to be slipped over the smaller diameter of the threaded portion of the stem 25. Pressure is applied to the packing 35 by forcing the tapered portion 39 of the stem through the packing ring to compress it between the cylindrical portion 38 and the sleeve 27. Sufficient pressure is thus obtained on the packing 35 to prevent leakage between the sleeve 27 and the stem 25. The seal also may be further perfected by forming the opening 26 in the container smaller than the cylindrical portion 38 of the stem so that this portion of the stem is tightly wedged in the opening 26 as it is in the packing ring 35. A double seal is thus formed between the fitting and the walls of the container to effectively prevent the escape of the liquid contents of the container through the opening formed in the container wall. The cut threads of the fabric 13 around the edges of the opening 26 in the container wall are also protected from the liquid of the container, whereby the disintegration of the container walls is prevented by the swelling action of the liquid on the fabric which may be absorbed through the cut ends of the threads by wick action.

The installation of the stem in the opening 26 of the container and the ring 35 in the sleeve may be facilitated by dipping the stem and the sleeve in water prior to the installation, as the stem will slide with ease over the rubber treated container wall and packing, since the water acts as a lubricant for these resilient members.

While the preferred form of this invention is described more or less in detail herein, it will be understood that changes may be made therein without departing from the spirit of this invention and the scope of the appended claims.

Having thus described my invention, what I claim and desire to protect by Letters Patent is:

1. A detachable hanger fitting for a container comprising a stud having a head for attaching said stud to a supporting structure, said stud also having a container wall clamping flange and an inner threaded stem formed integrally therewith, a sleeve adapted to slidably fit over said stem, a flange on said sleeve adapted to clamp a wall of the container against said first flange, a clamping nut threaded on said stem to retain said sleeve in clamped position, and a lock nut for retaining said clamping nut in clamped position.

2. In combination with a flexible container, a detachable hanger fitting for said container comprising a stud having an outer head for attaching said stud to a supporting structure, said stud also having an outer clamping flange and an inner threaded stem thereon, a gripping portion on the end of said stem extending beyond said threads for holding said stud against rotation, a sleeve adapted to slidably fit over said stem, a flange on said sleeve adapted to clamp the container wall between it and said first flange, a clamping nut threaded on said stem to retain said sleeve in clamped position, and means for retaining said clamping nut in clamped position against said sleeve.

3. In combination with a container having flexible walls, a detachable hanger fitting for said container comprising a stud having an outer head for attaching said stud to a supporting structure, said stud also having an outer clamping flange and an inner threaded stem thereon, said stem having a cylindrical portion larger than the threaded portion of said stem and positioned between said flange and said threaded portion, the end of said cylindrical portion tapering convergently towards said threaded portion, a sleeve adapted to slidably fit over said stem, a flange on said sleeve adapted to clamp said wall between it and said first flange, an internal recess in said sleeve, a packing ring in said recess adapted to seal the space between said sleeve and said cylindrical portion of said stem, a clamping nut threaded on said stem to retain said sleeve in clamped position against said wall, and a lock nut for retaining said clamping nut in clamped position against said sleeve.

4. In combination with a container having flexible walls, a detachable hanger fitting for said container comprising a stud having an outer head for attaching said stud to a supporting structure, said stud also having an outer clamping flange and an inner threaded stem thereon, a non-round gripping portion on said stem extending beyond said threaded portion for holding said stud against rotation, said stem having a cylindrical portion larger than the threaded portion of said stem and positioned between said flange and said threaded portion, the end of said cylindrical portion tapering convergently towards said threaded portion, a sleeve adapted to slidably fit over said stem, a flange on said sleeve adapted to clamp said wall between it and said first flange, an internal recess in said sleeve, a packing ring in said recess adapted to seal the space between said sleeve and said cylindrical portion of said stem, and a clamping nut threaded on said stem to retain said sleeve in clamped position against said wall.

WILLIAM B. CRAWFORD.

REFERENCES CITED

The following references are of record in the file of this patent:

UNITED STATES PATENTS

| Number | Name | Date |
|---|---|---|
| 504,133 | Schrader | Aug. 29, 1893 |
| 710,208 | Phillipson | Sept. 30, 1902 |
| 809,141 | Schutz | Jan. 2, 1906 |
| 1,020,668 | Thompson | Mar. 19, 1912 |
| 1,220,006 | Rowe | Mar. 20, 1917 |
| 1,610,712 | Schweinert | Dec. 14, 1926 |
| 1,640,430 | Stanley | Aug. 30, 1927 |
| 1,801,846 | Campbell | Apr. 21, 1931 |
| 2,243,796 | Fay et al. | May 27, 1941 |
| 2,457,066 | Pepersack | Dec. 21, 1948 |

FOREIGN PATENTS

| Number | Country | Date |
|---|---|---|
| 352,620 | France | Aug. 16, 1905 |
| 118,950 | Great Britain | Sept. 19, 1918 |